May 8, 1962 M. B. ÅBERG 3,033,736
APPARATUS FOR MAKING TUBES OF BONDED FLEXIBLE STRIPS
Filed April 19, 1957
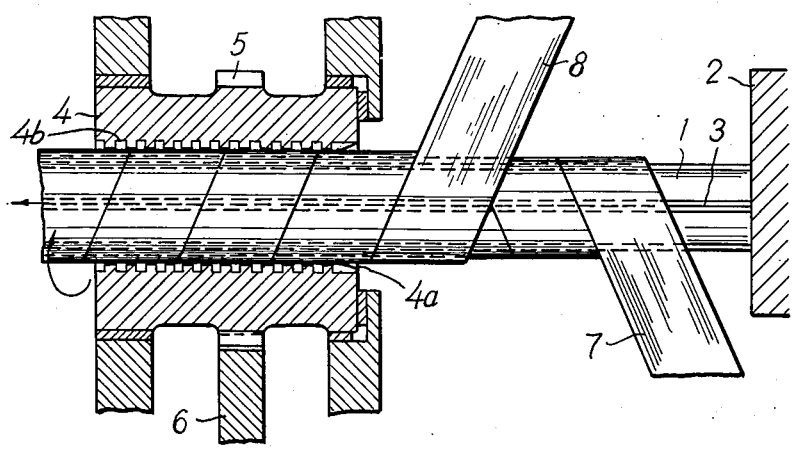

United States Patent Office 3,033,736
Patented May 8, 1962

3,033,736
APPARATUS FOR MAKING TUBES OF BONDED
FLEXIBLE STRIPS
Martin Birger Åberg, Lagan, Sweden
Filed Apr. 19, 1957, Ser. No. 653,919
Claims priority, application Sweden Apr. 19, 1956
1 Claim. (Cl. 156—431)

This invention relates to a method and a device for the manufacture of tubes by application of layers of strips of flexible material and in intermediate bonding agent to a mandrel and by simultaneous pressing the layers against each other and against the mandrel. Previously known methods and devices of this type are rather complicated and result in a large number of throw-outs for which reason the tubes have not been capable of competing from the point of view of manufacturing cost. The object of the invention is an improved method and a simple and reliable device of the type referred to. According to the invention, the layers of strips applied to the mandrel are introduced into the clearance between the mandrel and a surrounding sleeve the inner diameter of which corresponds substantially to the outer diameter of the finished tube, said sleeve and/or mandrel being provided with threads, and the sleeve and/or mandrel being rotated such as to move the layers of strips under pressure along the mandrel by engagement of the threads with the material of the tube.

The invention is described more closely hereinbelow with reference to the drawing which diagrammatically illustrates a device for carrying the invention into effect.

In the drawing, numeral 1 denotes a mandrel which projects from a stationary part 2 and has longitudinal grooves 3. The mandrel 1 extends through a sleeve 4 which is mounted for rotation and has internal threads 4b and an external gear rim 5 in mesh with a gear wheel 6 adapted to be driven by a motor not shown in the drawing.

The drawing illustrates the method of manufacturing a tube consisting of two layers of strips. The strips may advantageously consist of wood veneer or any other suitable material. As will be seen from the drawing, one strip 7 is wound onto the mandrel 1 in a certain direction, while the other strip 8 is wound onto the first layer in the opposite direction. The clearance between the mandrel 1 and the threaded inside of the sleeve 4 is so small that the layers are firmly pressed against each other. Due to this fact, threads will be formed on the outer layer such that the tube will be moved forward along the mandrel. The longitudinal grooves 3 on the mandrel prevent rotation of the tube. The sleeve 4 is rotated in a direction such as to tighten the outer strip 8. To facilitate introduction of the material into the sleeve 4, the inlet end of the sleeve is flared as indicated at 4a.

Before the strips are wound onto the mandrel they are provided with a bonding agent which either may be applied to the strips or may consist of an intermediate foil. Most of the bonding agents which may be used for this purpose must be heated. To this end, a heating element may be provided either in the mandrel or in the sleeve. However, heat is produced due to friction as the material passes through the sleeve and, for this reason, it may sometimes be necessary to cool at least the parts of the sleeve and/or mandrel which are located near the discharge end of the sleeve in order to prevent burns on the tube.

As mentioned above, the finished tube has comparatively shallow external threads. These threads may, if desired, be removed by grinding or similar treatment.

The device described may be modified in various manners within the scope of the invention. For instance, the device may comprise a rotary threaded mandrel and a stationary sleeve having longitudinal grooves. It is also possible to rotate both the mandrel and the sleeve, in which case both of said members are threaded and various constructions are conceivable. For instance, the two members may have threads of equal pitch and may rotate at equal speeds and in opposite directions. Instead thereof, the members may rotate in the same direction but at different speeds. In any case, the product of speed and pitch of thread should be the same for both members.

Although it is considered most suitable to wind the strips in the manner illustrated and described, it is also conceivable to have the strips extend longitudinally of the tube. Any suitable number of layers may be used. Longitudinally extending strips and helically wound strips may be applied alternatingly. Further modifications are possible and need not be described in particular.

What I claim is:

In apparatus for the manufacture of tubes from strips of flexible material, the combination comprising an elongated stationary mandrel adapted for receiving layers of the strips of flexible material with an intermediate bonding agent therebetween spirally wound thereon in the form of a tube, a plurality of longitudinally extending grooves on said mandrel spaced circumferentially about said mandrel and acting to prevent rotation of the tube, a rotatable sleeve surrounding said mandrel and the tube and having an inner diameter substantially corresponding to the outer diameter of the tube, means for rotating said sleeve, threads formed on the inner periphery of said sleeve along the entire length thereof for engagement with the tube, and means for rotating said sleeve causing said threads to axially move the tube under radial pressure relative to said mandrel.

References Cited in the file of this patent

UNITED STATES PATENTS

| | | |
|---|---|---|
| 934,683 | Lutz | Sept. 21, 1909 |
| 982,430 | Jenkins | Jan. 24, 1911 |
| 1,370,024 | Kampton | Mar. 1, 1921 |
| 2,002,896 | Kopetz | May 28, 1935 |
| 2,321,738 | Farny | June 15, 1943 |
| 2,322,677 | Walt et al. | June 22, 1943 |
| 2,502,638 | Becht | Apr. 4, 1950 |
| 2,637,674 | Stahl | May 5, 1953 |
| 2,766,160 | Bentov | Oct. 9, 1956 |